United States Patent [19]
Udding et al.

[11] 3,879,312
[45] Apr. 22, 1975

[54] PROCESS AND CATALYST

[75] Inventors: Anne C. Udding; Marie M. Schlesser, both of Amsterdam, Netherlands

[73] Assignee: Shell Oil Company, Houston, Tex.

[22] Filed: Jan. 7, 1974

[21] Appl. No.: 431,191

[30] Foreign Application Priority Data
Jan. 2, 1973 Netherlands.................. 7300007

[52] U.S. Cl................ 260/2 A; 260/2 R; 260/2 D; 260/2 XA; 260/446
[51] Int. Cl............................................ C08g 23/14
[58] Field of Search............. 260/2 A, 2 XA, 615 B

[56] References Cited
UNITED STATES PATENTS
3,542,828  11/1970  Harris................................ 260/446

*Primary Examiner*—Morris Liebman
*Assistant Examiner*—E. A. Nielsen

[57] ABSTRACT

The invention relates to a process for the preparation of polyether polyols by cationic polymerization of organic cyclic ethers using novel hydroxylammonium hexafluoroantimonate catalysts. It also relates to the novel hydroxylammonium hexafluoroantimonate catalysts and a process for producing same.

3 Claims, No Drawings

PROCESS AND CATALYST

BACKGROUND OF THE INVENTION

1. Field of the Invention

This invention is drawn to a novel catalyst for the polymerization of organic cyclic ethers, and the polymerization of cyclic ethers using the novel catalyst.

2. Prior Art

The use of certain ammonium hexafluoroantimonates as an acid catalyst for the polymerization of organic cyclic ethers has already been described in U.S. Pat. No. 3,542,828 issued to James J. Harris on November 24, 1970. The preferred antimonate was anilinium hexafluoroantimonate, $[C_6H_5 - NH_3]^+ [SbF_6]^-$.

Two properties are very important in regard to the selection of a catalyst for commercial use; (1) the catalyst must give a high yield of polymer per unit catalyst per unit time and (2) the molecular weight of the polymer must be in the desired range. The proper balance between the two properties has not fully been met by existing catalyst. The known organic ammonium hexafluoroantimonates, for example the preferred anilinium hexafluoroantimonate, can be used at higher temperatures in an effort to increase the rate of polymerization but this leads to a lowering of the molecular weight of the resulting polyether. By contrast, the hydroxylamine catalysts of the present invention give yields of polymer per mol. % of catalyst per unit of times that are about 9–25 times those obtained with the previously disclosed preferred simple amine catalysts. It is the presence of the hydroxyl group attached to the amine as contrasted with the known simple amines which imparts the unexpected high polymerization activity. This increase in activity allows the catalysts of this invention to be used at temperatures lower than previously claimed, thereby giving control over the molecular weight of the polymer.

The polymers made by the process and catalysts of this invention are useful as starting materials in the preparation of polyurethanes.

SUMMARY OF THE INVENTION

The invention is a novel class of organic hydroxylammonium hexafluoroantimonate catalysts and a process for the polymerization of organic cyclic ethers containing 2–6 carbon atoms inclusive using said catalysts.

DESCRIPTION OF THE PREFERRED EMBODIMENTS

The catalysts of the present invention are represented by the formula:

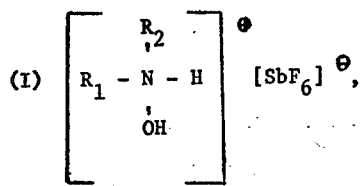

where $R_1$ is a hydrogen atom or an alkyl, aryl, arylalkyl or alkylaryl group, and $R_2$ is an alkyl, aryl, arylalkyl or alkylaryl group. The alkyl, aryl, arylalkyl and alkyl aryl groups expressed above are those having from 1–20 carbon atoms inclusive, preferrably 1–10 carbon atoms inclusive. Examples of suitable $R_1$ or $R_2$ groups are methyl, ethyl, phenyl, benzyl, o-, m-, or p-tolyl, -methoxyphenyl, -fluorophenyl and -chlorophenyl, such as m-chlorophenyl. The preferred groups are tolyl and/or benzyl groups; benzyl is particularly preferred.

Preferred catalysts are: mono- and diphenylhydroxylammonium hexafluoroantimonate, mono- and dibenzylhydroxylammonium hexafluoroantimonate mono- and bis(m-chlorophenyl)hydroxylammonium hexafluoroantimonate and mono- and bis(p-tolyl)hydroxylammonium hexafluoroantimonate. Dibenzylhydroxylammonium hexafluoroantimonate is particularly preferred.

The hydroxylammonium hexafluoroantimontimonates according to the invention may be prepared in any suitable manner.

Preferred processes for the preparation of the catalyst of this invention include (1) contacting an organic hydroxylamine having the formula $R^1R^2N-OH$ where $R^1$ and $R^2$ are defined as above with fluoroantimonic acid ($HSbF_6$), (2), contacting the hydrogen fluoride salt of the relevant hydroxyl amine having the formula $[R^1R^2NH-OH]^+ F^-$ where $R_1$ and $R_2$ are defined as above with antimony pentafluoride ($SbF_5$) or (3), as particularly preferred, contacting an alkali metal salt or the $NH_4$ salt of hexafluoroantimonic acid with a salt of the relevant hydroxylamine said salt being derived from an acid which will produce an isopropanol insoluble salt with alkali metal or ammonium ion. A preferred alkali metal is sodium, but particularly preferred is potassium. The preferred acids used to form the hydroxylammonium salts are sulfuric, nitric or a hydrogen halide. The particularly preferred acid for forming the hydroxylammonium salts is hydrogen chloride.

The hydroxylammonium hexafluoroantimenates having the general formula (I) have been found to be particularly suitable as catalysts for the homopolymerization and/or copolymerization of cyclic ethers which in addition to one oxygen atom contain 2 to 6 carbon atoms in a ring or preferably 2 to 4 carbon atoms in a ring. The use of the word polymerization is to be taken to generally mean homopolymerization or copolymerization. The cyclic ether monomers used in the present invention are represented by the formula:

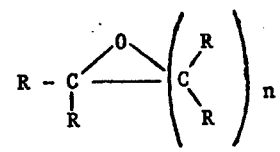

where n is an integer from 1 to 5 inclusive, R individually is a hydrogen, alkyl, alkyl halide, alkoxy, aryl or aryl halide or aryloxy group, the total number of carbon atoms in the monomer range from 2 to 20 inclusive preferably 2 to 10 inclusive, and at least one R attached to the carbon atom attached to the oxygen of the cyclic ether ring is a hydrogen. Examples of suitable monomers are: propylene oxide, ethylene oxide, isobutylene oxide, styrene oxide, tetrahydrofuran, epichlorohydrin, and phenyl glycidyl ether. Preferred monomers are propylene oxide and ethylene oxide. With some of the monomers in question the homopolymerization proceeds considerably slower than with certain other more reactive monomers. Thus, for instance, tetrahydrofuran has a relatively low reaction rate as compared with propylene oxide. However, in such cases excellent results are generally obtained if the less reactive monomer is copolymerized with another more reactive monomer. As monomers for the copolymerization it is preferred to select propylene oxide and tetrahydrofuran. However, a homopolymerization is normally preferred and the most preferred monomer is propylene oxide.

The amount of catalyst used may vary within wide limits, but is usually not more than about 0.1 mol % (based on the monomer), preferably between about 0.005 and about 0.075 mol %, and particularly preferred between about 0.010 and about 0.020 mol %.

It has been found favorable to carry out the polymerization according to the invention in the presence of one or more compounds which promote the formation of alcoholic hydroxyl end groups. In the present application such compounds are designated as "initiators." The initiators are not necessary for the polymerization but do offer a convenient method of producing polyols. Suitable initiators are organic compounds containing 2 to 5 or preferably 2 to 3 primary and/or secondary hydroxyl groups inclusive. Examples of suitable alkane polyols or polyether polyols, are ethylene glycol, glycerol, 1,4-butanediol, sorbitol, sucrose and pentaerythritol. Polyols having 2–20 carbon atoms, in particular 2–10 carbon atoms in the molecule are usually preferred. The choice of a suitable initiator depends, inter alia, on the desired proportion of the (co)polymer to be prepared. Thus, for example, bifunctional initiators, in particular 1,4-butanediol, are particularly suitable for the preparation of polyether polyols which may serve as base material for the production of polyurethane elastomers. If, on the other hand, it is desired to prepare a polyether polyol which is intended as base material for the production of polyurethane foams, higher functional initiators which cause cross-linking are preferred. In this respect glycerol, for example, is very suitable. The amount of the initiator used determines the molecular weight of the resultant (co)polymer. As the amount of initiator increases, the molecular weight drops. The amount of initiator used is up to 20 mol %, based on the monomer. Initiator concentration between about 0.01 and 20 mol % is suitable, from about 0.05 to about 5 mol % is preferred and between 1.0 and 2.5 mol % is particularly preferred. (The use of polyols as "initiators" in cationic polymerization has been discussed in the book "THE CHEMISTRY OF CATIONIC POLYMERIZATION" edited by P. H. Plesch, Macmillan Co., New York, 1963 and is referred to in U.S. Pat. No. 2,897,163 issued July 28, 1959).

The reaction temperature for the polymerization is selected from within a wide range. Suitable temperatures are normally between about −50°C and about +150°C, preferred between about −10°C and about +100°C, and particularly preferred between about 20°C and about 60°C. While the reaction rate generally increases as the temperature rises, it has been found that a higher reaction temperature often results in a decrease of the molecular weight of the resultant (co)polymer. Where it is desired to prepare a product having a high molecular weight, for example > 1500 (by hydroxyl group determination), it is often advantageous to select a temperature at which the reaction proceeds at a rate lower than the maximum. By using the particularly active catalysts according to the invention it is now possible to prepare products having a high molecular weight within a reasonable period of time at relatively low temperatures. Thus, by polymerizing propylene oxide within 6 hours at approximately 36°C polyether polyols having a molecular weight of, for example, 1500–5000 were obtained.

The polymerization is carried out at sub-, super or atmospheric pressure, but pressures suitable to contain the monomer in solution at the chosen reaction temperature are sufficient. Suitable pressures range between about 0.5 atmospheres and about 10 atmospheres, preferably between about 0.5 and about 5 atmospheres.

The polymerization may be carried out in the presence or absence of one or more inert solvents or diluents. Examples of solvents or diluents which are used, if desired, are benzene, toluene, methylene chloride and hexane.

After completion of the polymerization, the catalyst can be removed from the product by washing with water. However, the catalyst is preferably neutralized by addition of a strong base to the resultant product. 1,4-Diazabicyclo-[2.2.2]octane has been found to be particularly suitable as strong base. The process of the invention is carried out batchwise or as a continuous process.

The polymers obtained in accordance with the process of the invention normally contain a considerable number of the hydroxyl groups present as primary OH-groups, for example approximately 50–60%. They are particularly suitable as starting materials for the preparation of polyurethanes by a reaction with, for example, bifunctional isocyanates, such as 4,4'-diphenylmethane di-isocyanate and 2,4- and/or 2,6-tolylene di-isocyanate. The resultant polyurethane rubbers may be thermoplastic and may be readily processed to shaped articles. Other applications are obviously also possible, for example as starting materials for the preparation of polyurethane foams.

To illustrate the manner in which the invention may be carried out, the following Embodiments are given. It is to be understood, however, that the Illustrative Embodiments are for the purpose of illustration and the invention is not to be regarded as limited to any of the specific materials or conditions recited herein.

Illustrative Embodiment I

Catalyst Preparation

A mixture of 600 ml of isopropyl alcohol and 200 ml of benzene was made anhydrous by azeotropic distillation during which distillation 150 ml of distillate was removed. Subsequently, 10 g (0.04 mol) of dibenzylhydroxylammonium chloride and 11 g (0.04 mol) of $KSbF_6$ were added successively and the resultant mixture was refluxed for 3 hours. After cooling, the resultant KCl (3 g) was removed by filtration, after which the solvents were removed from the filtrate by distillation at reduced pressure (approximately 20 mm Hg). Residues of isopropyl alcohol were removed from the remaining slurry by azeotropic distillation after addition of benzene (two portions of 50 ml). The crystallized product was finally filtered off and analysed. 15 G of dibenzylhydroxylammonium hexafluoroantimonate (I; $R^1 = R^2 = C_6H_5CH_2-$) were obtained which melted between 180° and 185°C. The yield was 83% of theory.

Analysis:
$C_{14}H_{16}ONSbF_6$

Calculated: C 37.36%; H 3.58%; N 3.11%; Sb 27.05%
Found: C 36.6%; H 3.5%; N 3.03%; Sb 26.5%.

In a similar manner p-tolylhydroxylammonium hexafluoroantimonate (I: $R^1 = H$, $R^2 = (p)-H_3C-C_6H_4-$) was prepared. The yield was 80% of theory.

Illustrative Embodiment II

Polymerization of propylene oxide a. See table I, experiments 1-3 and 6.

The catalyst and, if employed, an initiator (1,4-butanediol or glycerol), were successively introduced into a 250-ml dry glass reaction vessel which was filled with nitrogen and provided with a cooling jacket, stirrer and reflux condenser. After the catalyst had dissolved, a quantity of 100 ml of dry propylene oxide (PO) was then gradually added to the mixture at a rate of approximately 1-2 ml/min. with stirring. After 10-15 minutes the mixture had reached the boiling temperature (36°C), as a result of the exothermic reaction, and the mixture was then stirred for another 6 hours (catalyst B) or 24 hours (catalyst A), while the reflux condenser was cooled with isopropyl alcohol at −10°C. To neutralize the catalyst the stoichiometric quantity of a strong base, viz., 1,4-diazabicyclo [2.2.2] octane was added to the resultant liquid polypropylene glycol (PPG).

b) See Table I, experiments 4 and 5.

The catalyst, under nitrogen, was charged to dry 50-ml polymerization tubes, the tubes being subsequently sealed with a rubber stopper. A quantity of 10 ml of propylene oxide - and where appropriate 1,4-butanediol - was then added by means of a syringe. The mixture was allowed to stand for 6 hours (catalyst B) or 24 hours (catalyst A), the temperature rising as a result of the exothermic reaction and subsequently dropping again. The catalyst was then removed from the resultant polypropylene glycols by washing with water.

The yields mentioned in Table A were obtained with the novel catalyst according to the invention (B) after only 6 hours, whereas the yields obtained in the comparative tests with a known catalyst (A), which in any case were much lower, could only be obtained after 24 hours.

TABLE I

Polymerization of propylene oxide with a known catalyst A and with a catalyst according to the invention B A = anilinium hexafluoroantimonate
B = dibenzylhydroxylammonium hexafluoroantimonate

Illustrative Embodiment III

Experiment 4 of Illustrative Embodiment II b) was repeated in an analogous manner, with the exception that the catalyst used was p-tolylhydroxylammonium hexafluoroantimonate. The resultant yield of polypropylene glycol was 80%.

Illustrative Embodiment IV

Copolymerization of propylene oxide and tetrahydrofuran

In a similar way as described in Illustrative Embodiment II a) a copolymerization was carried out with tetrahydrofuran and polypropylene oxide as monomers which were used in a molar ratio of 1 : 1. In this experiment the PO was gradually added to the tetrahydrofuran in the presence of dibenzylhydroxylammonium hexafluoroantimonate as catalyst (0.015 mol % based on PO) and of 1,4-butanediol as initiator (1.2 mol % based on PO). The yield of copolymer was 76%.

Illustrative Embodiment V

Preparation of polyurethane rubber

A quantity of 0.05 mol of polyetherdiol (MW(OH) = 2000) obtained according to a process analogous to the one described in Illustrative Embodiment II, experiment 3, was carefully dried in a roundbottomed flask by heating in vacuo (2 mm Hg) at 80°C with stirring. After cooling to 60°C, 0.1 mol of 4.4'-diphenylmethane di-isocyanate was added and the mixture was subsequently stirred for 2 hours at 80°C. 0.05 mol of 1,4-butanediol was then added added at 60°C with stirring. The resultant mixture was finally poured into a mold and subsequently heated under pressure at 100°C for 24 hours.

The resultant rubber sheet (15 × 15 × 0.15 cm) was tested in accordance with ASTM-method D 12–468 with the following results:

| | |
|---|---|
| modulus at 300% elongation | 1.1 MN/m² (Mega Newtons per square meter) |
| tensile strength at break | 8.0 MN/m² |
| elongation at break | 1245% |

Illustrative Embodiment VI

Experiment 4 Illustrative Embodiment II is repeated except dimethyammonium hexafluoroantimonate is used as the catalyst. A satisfactory yield of polymer is obtained.

Illustrative Embodiment VII

Experiment 4 Illustrative Embodiment II is repeated except p-tolylammonium hexafluoroantimonate is used as the catalyst. A satisfactory yield of polymer is obtained.

| Exp. No. | Propylene/ oxyde, ml | Cat., mol % [1] | 1,4-Butane-diol, mol % [1] | Yield of PPG A % | Yield of PPG B % | Mol weight [3] B |
|---|---|---|---|---|---|---|
| 1 | 100 | 0.010 | 2.2 | 23 | 84 | 1870 |
| 2 | 100 | 0.015 | — | 20 | 90 | 2730 |
| 3 | 100 | 0.015 | 2.2 | 15 | 95 | 1800 |
| 4 | 10 | 0.02 | — | 35 | 80 | 1750 |
| 5 | 10 | 0.02 | 1.1 | 17 | 75 | 2030 |
| 6 | 100 | 0.015 | 1.4 [2] | | 73 | 4100 |

[1] mol/100 mol of propylene oxide.
[2] Glycerol
[3] Molecular weight based on the number of hydroxyl groups in the polymer (Mw(OH)).

Illustrative Embodiment VIII

Experiment 4 Illustrative Embodiment II is repeated except diphenylammonium hexafluoroantimonate is used as the catalyst. A satisfactory yield of polymer is obtained.

Illustrative Embodiment IX

Experiment 4 Illustrative Embodiment II is repeated except methoxyphenylammonium hexafluoroantemonate is used as the catalyst. A satisfactory yield of polymer is obtained.

Illustrative Embodiment X

Experiment 4 Illustrative Embodiment Ii is repeated except di(m-chlorophenyl)ammonium hexafluoroantimonate is used as the catalyst. A satisfactory yield of polymer is obtained.

I claim as my invention:

1. In the process of acid-catalyzed polymerization of organic cyclic ethers using represented by the formula

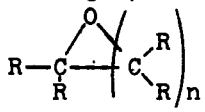

where $n$ is an integer from 1 to 5 inclusive, R individually is a hydrogen, alkyl, haloalkyl, alkoxy, aryl, or haloaryl, the total number of carbon atoms being from 2 to 20, inclusive, and at least one R attached to the carbon atom attached to the oxygen of the cyclic ether ring is a hydrogen catalytic amounts of salts of hexafluoroantimonic acid as catalyst and optionally organic polyols as initiators, the improvement which comprises using as the catalyst a hydroxylamonium hexafluoroantimonate having the formula;

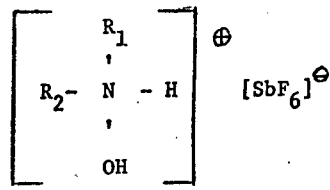

where $R_1$ is a hydrogen atom or an alkyl, aryl, alkylaryl or arylalkyl group having from 1 to 20 carbon atoms inclusive and $R_2$ is an alkyl, aryl, alkylaryl or arylalkyl group having from 1 to 20 carbon atoms inclusive.

2. The process of claim 1 where $R_1$ and $R_2$ are benzyl groups.

3. The process of claim 1 where the cyclic ether is propylene oxide, the initator is about 1.0 to about 2.5 mol % of 1,4 butanediol based on propylene oxide, and the catalyst is about 0.01 to about 0.02 mol % of dibenzlhydroxylammonium hexafluoroantimonate based on propylene oxide.

* * * * *